United States Patent Office 3,169,932
Patented Feb. 16, 1965

3,169,932
METHOD OF PRODUCING ARTIFICIAL MARBLE FROM BARIUM SULFATE AND AQUEOUS ALKALI SILICATE
Mohammad Aslam, Syed Tehzibul Hasan, Riaz Ali Shah, and Khurshid Naqui Zaidi, Karachi, Pakistan, assignors to Pakistan Council of Scientific and Industrial Research, Karachi, Pakistan
No Drawing. Filed Mar. 21, 1962, Ser. No. 181,483
8 Claims. (Cl. 252—478)

This invention relates to a process for the production of ceramic materials, particularly materials which are relatively efficient radio-active radiation shields, and even more particularly, this invention relates to a process for manufacturing artificial marble having comparatively high strengths.

The prior art discloses various methods to produce artificial marble. For example, techniques have been developed based on the cold-setting magnesium oxychloride cements. Other techniques are based on the cold-setting of white cement; while still other techniques are based on the cold-setting of gypsum or plaster of Paris. Even further, it has been suggested to employ sand or stone with soluble silicates as a binder and drying the molded material.

All of the foregoing processes have two features in common; firstly, the final products exhibit extremely low compressive and flexural strengths as compared with natural marble, and secondly, all of these processes are cold-setting processes. Of course, it is understandable why the workers in the prior art utilized the technique of cold-setting to manufacture artificial marble, inasmuch as from the standpoints of process economics and technological simplicity, a cold-setting process is highly desirable. Furthermore, there was no indication in the prior art that it was possible or even desirable to produce a higher strength artificial marble.

An object of the present invention, therefore, is to produce ceramic materials having much higher strengths than the artificial marbles produced in the prior art.

Another object of this invention is to provide a process which produces ceramic materials which are excellent radio-active radiation shields, as compared to natural marble.

Still another object of this invention is to provide a process for the production of artificial marble which, from the aesthetic and mechanical standpoints, compares favorably with natural marble.

Other objects and advantages of the present invention will become apparent upon further study of the specification and appended claims.

To attain the objects of the present invention, a process is employed comprising the steps of mixing particulates of pulverized, insoluble, non-setting alkaline earth sulfates with a soluble silicate, molding the product under pressure, drying and firing it in a furnace. The resultant product is an excellent radio-active radiation shield, and by the further step of rubbing and polishing the surfaces thereof, a final product is obtained having a desirable marble-like finish.

Examples of insoluble, non-setting alkaline earth sulfates which can be employed as the basic ingredient of the present invention are: barium and strontium sulfates in any form, gypsum, anhydrous calcium sulfate and fully hydrous calcium sulfate ($CaSO_4 \cdot 2H_2O$).

Of these it is preferred to employ barium, strontium and calcium sulfates, particularly the respective minerals, barytes, celestites and gypsum. It is also beneficial, in some cases, to employ mixtures of these materials.

The word "insoluble" in connection with the alkaline earth sulfates of this invention is defined as having a maximum solubility at 20° C. of about 0.2 gram sulfate in 100 grams of water.

The word "non-setting" refers to such sulfates which when mixed with water do not set to a solid mass.

It may be mentioned here that alkaline earth sulphates which are soluble or set with water form gels when mixed with the solution of silicate. This on firing yields porous products of very poor surface and flexural strengths. Moreover, as the water-solubility of such a product is high, it cannot be used in places where it is subjected to frequent washing and scrubbing.

It is particularly desirable to employ barium sulfate in this invention, inasmuch as it is unnecessary to add any flux to enhance the marble finish of the final product.

When using other alkaline earth sulfates, it has been discovered that the addition of a chloride of an alkali or alkaline earth metal significantly improves the finish of the artificial marble made therefrom. It is preferred to incorporate the chlorides in concentrations of 0.2–1%, based on the weight of the sulfate. Examples of the various chlorides that can be employed in this invention are sodium chloride, calcium chloride and zinc chloride.

With respect to the soluble silicate which is employed as a binder for the sulfate, any type may be utilized, such as sodium or potassium silicates. These binders are incorporated with the sulfate in a proportion of 1–10% by weight of alkaline earth sulfate, preferably 3 to 7%. These binders are added in the form of aqueous solutions, the preferred concentrations being 10 to 20% by weight of the alkali silicate.

The binders and the sulfate are thoroughly mixed in order to obtain a substantially uniform mass. To obtain a mass of the desired properties, it is preferable to employ a sulfate having a particle size range of from 100 to 300 mesh, particularly 200 to 300 mesh. This step of mixing can be accomplished, for example in a kneader for a period of a few hours.

After the mixing step is completed, the mass is molded under pressure. In order to obtain a final product having the desired mechanical properties, it is important to mold the mixture at a pressure of at least 500 p.s.i.g., preferably 1,000 to 4,000 p.s.i.g. Any conventional hydraulic press can be employed for this molding step.

The molded product is then dried to expel any chemically uncombined water. Obviously, this step can be accomplished by room temperature drying or, for the purposes of hastening the drying rate, the molded product may be placed in ovens at about 105° C.

After the molded product is dried, it is then fired by placing the product in a furnace, wherein the temperature is gradually raised to 800–1150° C., the rate of rise preferably not exceeding 100° C. per hour. Within the range of 800–1150° C. the best results are obtained in the range of 900° C. to 1100° C. Once the desired maximum temperature is reached, the product is maintained at said temperature for about 0 to 8 hours, preferably 1 to 2 hours.

The firing step can be conducted in conventional equipment, but it is preferred to employ a muffle furnace in order to obtain relatively close control of temperatures.

After the firing step, the ceramic material is cooled to a temperature of about 200° C. or below and it is then polished and rubbed with wax in the manner usually employed for natural marble. Any waxy composition preferably in the form of an emulsion may be used for this purpose.

The artificial marble made according to our process has a stone-like look as well as feel, whereas the products of prior inventions at best resemble only in looks.

Artificial marble made by the foregoing described process exhibits the following properties:

|  | Artificial marble | Natural marble (Pakistani) |
| --- | --- | --- |
| Density, Lbs./c ft | 150–250 | 160 |
| Flexural strenght (dry) p.s.i | 3,000–4,000 | 3,800 |
| Flexural strenght (wet) p.s.i | 1,600–2,600 | 2,900 |

The properties of the artificial marble set forth in the preceding table encompass all the types of marble using the various sulfates and process conditions described in this invention.

With respect to the upper limits of the flexural strengths of the artificial marble, it has been discovered that materials exhibiting such high strengths are produced when barytes is used with 3 to 7% sodium silicate. It is also necessary for this purpose to use material which is entirely free from carbonates. Such impurities disintegrate during firing and give low flexural strengths. Other factors influencing the strength are the use of high pressure for molding, preferably 1 ton or above per sq. in., and slow rate of raising temperature, preferably 20 to 25° C. per hour, during firing.

It has been noted that the cerami cmaterials made in accordance with this invention exhibit considerably higher shielding efficiencies than natural marble. Results of shielding properties using cobalt 60 as a radio-active radiation source are given as follows:

| Percent Absorption | Thickness of materials in cm. | | |
| --- | --- | --- | --- |
| | Lead | Artificial marble | Natural marble |
| 90 | 4.4 | 14.5 | 23.0 |
| 99 | 9.0 | 28.0 | 46.0 |

The specific artificial marble having the shielding properties set forth in the preceding table is made by using barytes as the raw material. No other alkaline earth sulfate is suitable for obtaining such shielding properties.

For purposes of illustration, the following preferred specific embodiments are presented. It is to be appreciated, however, that the specific ingredients and polishing conditions utilized in these examples are not intended to be limitative of the specification, taken as a whole, and the appended claims.

*Example 1*

Pulverized barytes (20 kg.) is gradually added in a kneader to a 20% solution of sodium silicate (5 kg.), and mixed for a few hours. The mix is pressed in a hydraulic press under a pressure of one ton p.s.i. The molded product is dried and then fired in a muffle furnace. The rise of temperature in the furnace is regulated at a rate of 50° C. per hour until a temperature of 1050° C. is reached. After firing, the product is rubbed and polished with wax to get the marble finish.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What we claim is:
1. A method of producing artificial marble which method comprises the steps of:
   1. A method of producing artificial marble which ing a particle size at least as small as about 100 mesh and an aqueous solution of an alkali silicate in a proportion of about 1–10% by weight of the dry silicate, based on the sulfate;
   (2) molding said mixture under a pressure of at least 1,000 p.s.i.;
   (3) drying said molded mixture;
   (4) firing the dried molded mixture in a furnace at 800–1150° C. to obtain a hard strong structural material; and
   (5) polishing the surfaces of said structural material with wax to obtain a marble-like finish.
2. The method of claim 1 wherein the mixture is molded at a pressure of at least 2000 p.s.i.
3. The method of claim 1 wherein the temperature of the furnace is gradually raised to 800–1150° C. at a rate of about 20–25° C. per hour.
4. The method of claim 1 wherein the alkali silicate is sodium silicate, present in a proportion of about 3–7% by weight of the dry silicate, based on the sulfate.
5. The method of claim 1 wherein the alkali silicate is present in a 10–20% by weight concentration in the aqueous solution.
6. The method of claim 1 wherein the barium sulfate in step (1) has a particle size of 100 to 300 mesh.
7. The method of claim 1 wherein prior to step (5) the fired molded mixture is cooled to a temperature below about 200°.
8. A method of producing artificial marble, which method comprises the steps of:
   (1) forming a mixture consisting essentially of barium sulfate particulates having a particle size of about 200–300 mesh and an aqueous solution of sodium silicate and a 10–20% by weight aqueous solution of sodium silicate, the proportion of sodium silicate on a dry basis being about 3–7% based on the sulfate;
   (2) molding said mixture under a pressure of at least 2,000 p.s.i.;
   (3) drying said molded mixture at about 105° C.;
   (4) raising the temperature of the dry molded mixture at a rate of about 20–25° C. to about 900–1100° C., and firing the molded mixture at about 900–1100° C. for about 1 to 2 hours, thereby obtaining a hard strong structural material;
   (5) cooling the fired molded product to a temperature below about 200° C., and
   (6) polishing the surfaces of said structural material with wax to obtain a marble-like finish.

References Cited in the file of this patent
UNITED STATES PATENTS

| 751,664 | Lyman | Feb. 9, 1904 |
| 1,703,097 | Chassevent | Feb. 26, 1929 |
| 2,531,496 | Bean | Nov. 28, 1950 |
| 2,992,175 | Borst | July 11, 1961 |

FOREIGN PATENTS

| 209,936 | Australia | Feb. 2, 1956 |
| 228,958 | Australia | Jan. 22, 1959 |

OTHER REFERENCES

Nucleonics, vol. 19, No. 11, November 1961, page 160.